June 16, 1942.   J. LEDWINKA   2,286,609
WHEEL SUSPENSION FOR VEHICLES
Filed May 17, 1940   3 Sheets-Sheet 1
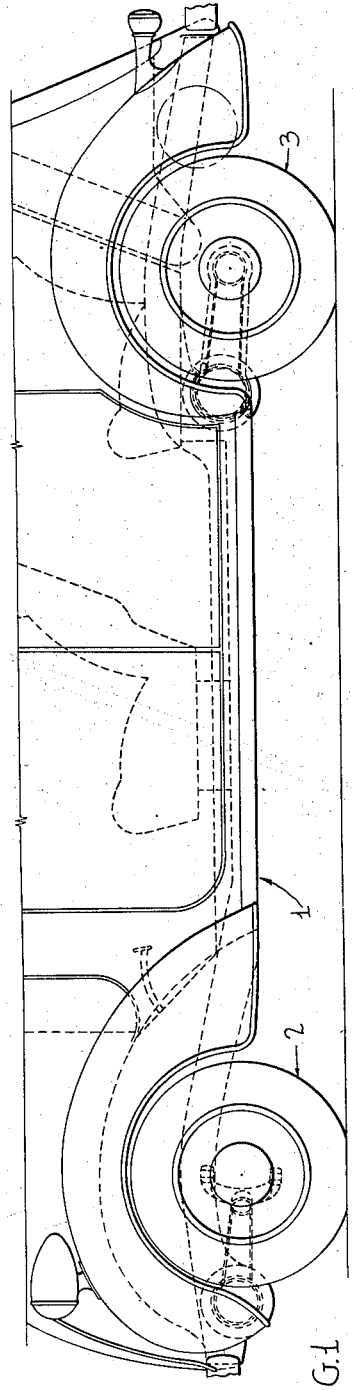
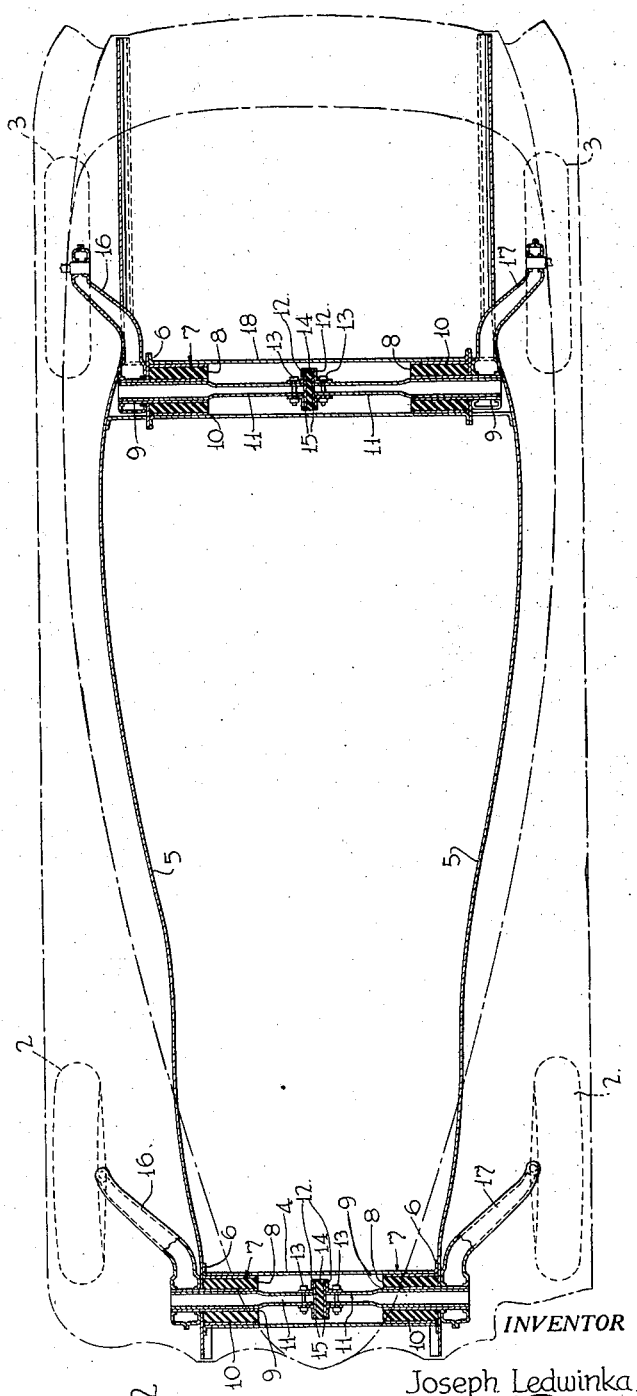
INVENTOR
Joseph Ledwinka
BY John P. Tarbox
ATTORNEY

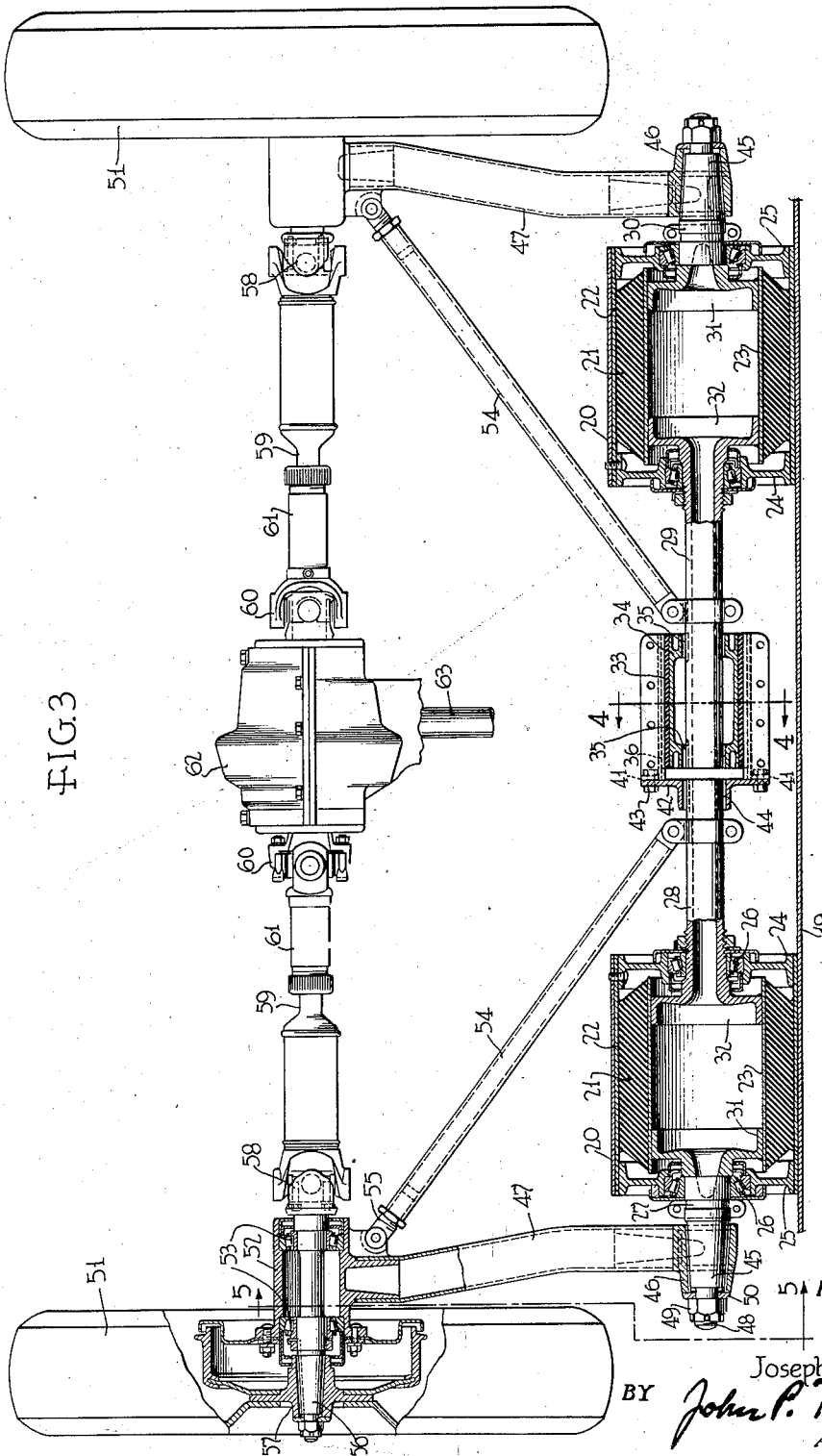

June 16, 1942.    J. LEDWINKA    2,286,609
WHEEL SUSPENSION FOR VEHICLES
Filed May 17, 1940    3 Sheets-Sheet 3
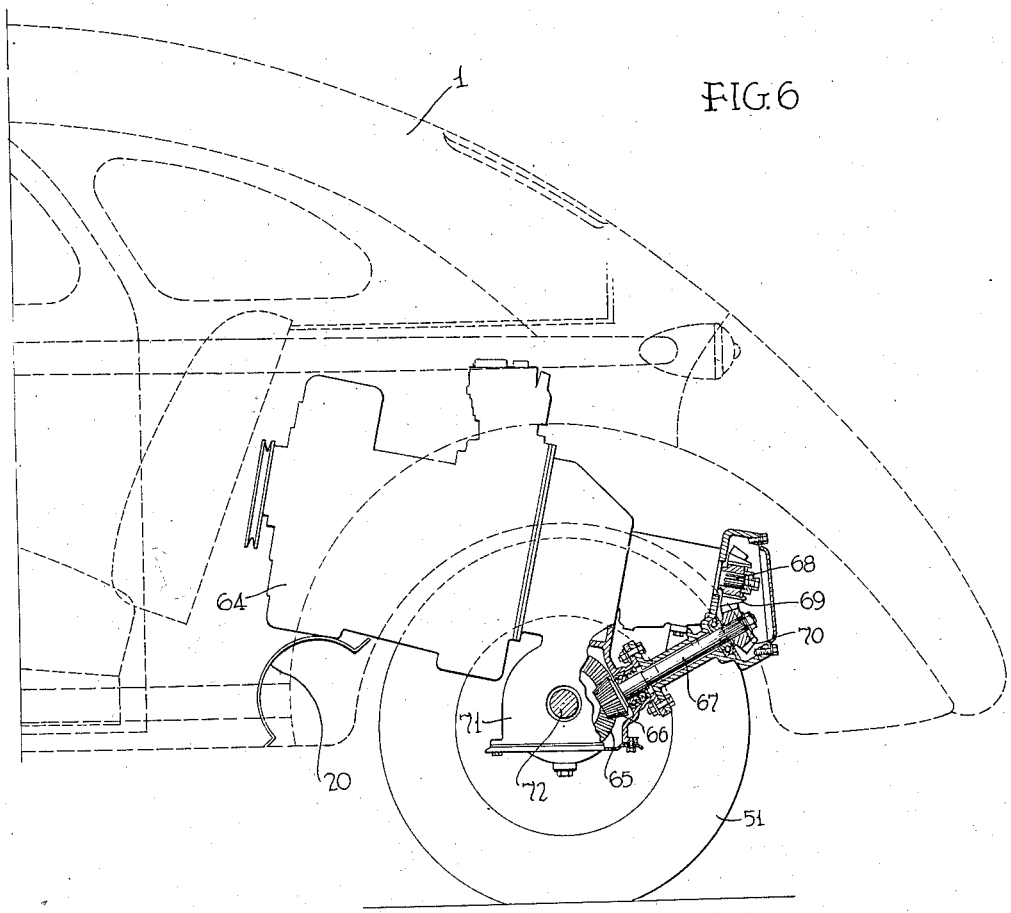
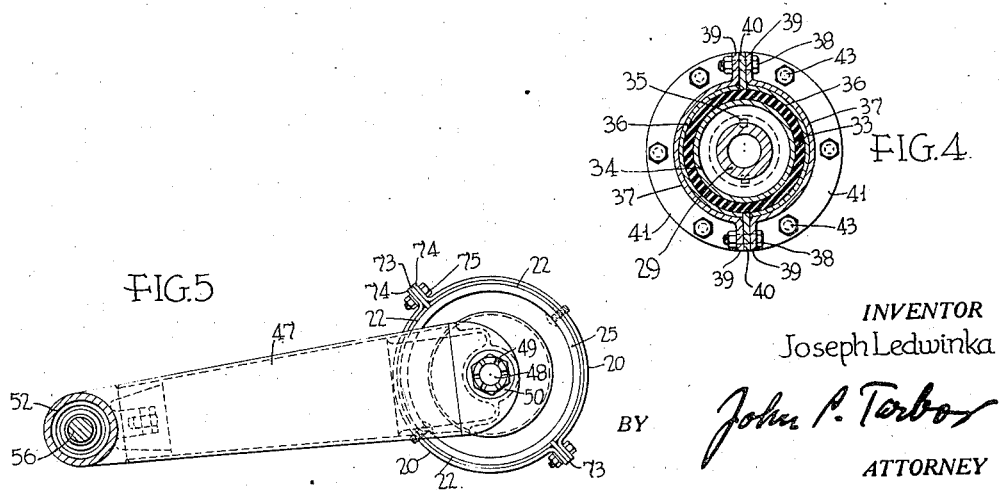
INVENTOR
Joseph Ledwinka
BY John P. Torbor
ATTORNEY Patented June 16, 1942

2,286,609

UNITED STATES PATENT OFFICE 2,286,609

WHEEL SUSPENSION FOR VEHICLES

Joseph Ledwinka, Philadelphia, Pa., assignor to Edward G. Budd Manufacturing Company, Philadelphia, Pa., a corporation of Pennsylvania Application May 17, 1940, Serial No. 335,813

7 Claims. (Cl. 267—21)

The present invention relates to spring suspensions for vehicle wheels. More specifically, it relates to spring suspensions making use of rubber or similar yieldable material, which is stressed in shear or in compression when in service.

By means of the present invention it becomes possible to secure the advantages of the so-called "knee-action" by means of far simpler mechanisms than those of the conventional type, embodying levers, links and metal springs of the ordinary kinds.

The spring material of the inventive structures is used either in the form of a sandwich, that is, a flat slab of rubber or the like having a metal plate secured to each face thereof, and/or in the form of a tube or ring of yieldable material, with one metal tube within and secured to the inner surface of the material, and another metal tube surrounding said material and secured to the outer surface thereof, both forms of such composite metal-and-rubber structure being used in the new vehicle suspension.

The outstanding objects, advantages and features of the invention will be pointed out particularly in the present specification, in part will be self-evident from the disclosure of the same, in connection with the accompanying drawings, which show several preferred embodiments thereof.

In said drawings:

Fig. 1 is a diagrammatic side elevation of the lower portion of a vehicle embodying the invention;

Fig. 2 is a diagrammatic plan view corresponding thereto, the springs and associated structure being shown in horizontal axial section;

Fig. 3 is a diagrammatic detail plan view on a much larger scale, partly in horizontal axial section, showing the structures of the rubber spring assemblies and their relations to the running gear, the specific example here illustrated referring to a rear wheel drive;

Fig. 4 is a section, on an enlarged scale, through one of the rubber springs of Fig. 3, on the plane indicated by the line 4—4 thereof;

Fig. 5 is a partly sectional side elevation of a portion of the structure illustrated in Fig. 3, the section being made on the plane indicated by the line 5—5 thereof; and Fig. 6 is a partly sectional side elevation of a rear-drive mechanism, a portion of the vehicle body being indicated in dotted lines.

In all the figures, similar elements are indicated by the same reference characters.

In order to obtain a general understanding of the invention, Figs. 1 and 2 will be discussed first.

The body 1 of the vehicle is carried by the front wheels 2 and rear wheels 3. For simplicity, the engine and the mechanism transmitting its power to the wheels have been omitted in these figures.

At the forward end of the vehicle, a tubular casing 4 is provided, which is rigidly secured to the self-supporting body or chassis 5. As shown, the casing has a flange 6 at each end, extending radially outward therefrom, and said flange is secured to the chassis in any preferred way, for instance, by welding. The casing extends across the vehicle from one side member to the other and houses two tubular rubber spring assemblies 7, one at each end.

Each assembly comprises a rubber tube 8, having an iron or steel tube or sleeve 9 vulcanized to its inner surface and a second sleeve 10 vulcanized to its outer surface. The sleeves 10 are secured rigidly to the casing 4, preferably by screws or the like, whereas the sleeves 9 are similarly secured to the enlarged end portions of the shafts 11, which pass through them.

Each shaft 11 has a flanged member 12 secured to its inner end, for example by the bolts 13. Between the circumferential flanges of the members 12 is located a circular rubber sandwich, comprising a disc 14 of rubber with a steel or iron disc 15 vulcanized to each face thereof, said discs 15 in turn being secured to the respective flanges by welding.

The outer end of each shaft 11 is received in a corresponding hole in the respective wheel carrying arm 16 or 17, and said arm secured to the shaft in any preferred way, for instance, by welding.

Inasmuch as the rear tubular casing 18 is practically the same as the forward one just described, differing therefrom only in length and in that the ends of the shafts mounted therein are within the chassis frame instead of extending beyond its sides, it is not necessary to describe the elements within said casing 18 in detail. Accordingly, the same reference characters have been applied to the corresponding elements therein.

The basic principles of operation of the invention will be explained in connection with Figs. 1 and 2. When the front tires 2 support their loads, it is obvious that the rubber sleeves 8 will be subjected to circumferential shear, and will be stressed between the stationary casing 4 and the rotatable tubes 9 until the stress in the rubber suffices to balance the loads. If the front wheels 2 are equally loaded, the two rubber sleeves 8 will likewise be stressed alike and will alone support the said stresses. However, should one tire assume more load than the other, the rubber disc 14 will be stressed to an extent corresponding to the difference of the loads, and this in turn will tend to cause the front tires to share the load correctly. It is obvious also that either tire may move vertically independently of the other, as in vehicles having "knee-action," when such tire strikes an obstruction or a depression.

Referring now to Figs. 3, 4 and 5, the invention will be described in greater detail.

Secured to the member 19 forming a part of the chassis or body understructure, are the casings 20 which are spaced apart as shown. Each casing houses a rubber spring assembly, comprising the tube or sleeve 21 of rubber, having a steel tube 22 secured to its outer surface, preferably by vulcanizing, and an internal sleeve 23 of similar material secured to the inner surface of the rubber tube 21.

The sleeve 22 is split into halves as shown in Fig. 5, and the casing 20 is likewise split as shown. Keys 73 are clamped between flanges 74 on said casing sections, by means of the bolts 75. These keys engage between the adjacent edges of the sections of the tube 22, and thus unite the casings 20 firmly to the rubber springs 21.

Each casing 20 is secured rigidly to the body member 19 in any suitable way, for example, by means of the end flanges or spiders 24 and 25. Said end closures carry races for roller or other bearings 26, which serve to support several shafts in alinement with one another, namely the shafts 27, 28, 29 and 30. The inner end of shaft 27 carries an enlarged flange 31 and the adjacent end of shaft 28 carries a similar flange 32, facing the flange 31, the peripheries of both flanges being secured to the inner metal sleeves 23 in any preferred way, so that the alined shafts 27 and 28 may rotate jointly in said bearings and in so doing will stress the corresponding rubber tubes 21 in circumferential shear.

Shafts 29 and 30 at the other side of the vehicle are likewise provided with flanges 31 and 32, which are secured to the corresponding inner sleeve 23 of the other spring assembly so that the alined shafts 29 and 30 may also turn as a unit, by stressing the corresponding rubber spring in shear.

In order to provide a yieldable resilient connection between the shafts 28 and 29, an additional rubber spring device is engaged with the inner ends thereof. This comprises the rubber sleeve 33, whose inner surface is vulcanized or otherwise secured to the steel tube 34 inserted thereinto, said tube 34 in turn being secured to the shaft 29 in any suitable way, for example, by means of the keys 35. Surrounding the rubber tube 33 and secured thereto, preferably by vulcanizing, is the split tube 36 consisting of two tubular half-cylinders as shown in Fig. 4.

In order to provide a mechanical connection to said outer sleeve 36, a casing 37 is provided which likewise consists of two equal portions, held together by bolts 38 passing through end flanges 39. Keys 40 are clamped between the flanges and these keys extend entirely through the tubular member 36 as best shown in Fig. 4, so that thus the casing 37 can turn only by carrying along the sleeve 36.

The casing 37 has a flange 41 at one end thereof and this flange is secured to the flange 42 by means of bolts 43, the flange 42 being itself keyed to the inner end of the shaft 28 by means of keys 44. Thus any relative rotation of shafts 28 and 29 will stress the rubber sleeve 33 in circumferential shear.

The outer end of shaft 27 may have a tapered portion 45, upon which fits a correspondingly shaped end 46 of a wheel supporting arm 47. Any suitable keys or the like may be employed to secure these parts together, the end of shaft 27 preferably having a reduced screw-threaded portion 48, cooperating with a nut 49 and washer 50 to hold the parts in place.

The wheel 51 may be mounted by means of a housing 52 containing the bearings 53, said housing 52 being secured to the other end of the arm 47. A brace or strut 54, having an adjustable screw-threaded end 55, will preferably be provided to hold the casing 52 in proper position with respect to the shaft 28, as shown.

Since the wheel 51 is shown as a driven wheel, means must be provided for supplying the power thereto, and this is here accomplished by the stub shaft 56 keyed to the hub 57 of the wheel at its outer end, and having a universal joint 58 at its inner end. This universal joint is connected by an extension link 59, 61 to a second universal joint 60, extensibility being provided by the shaft 59 shifting longitudinally in the companion member 61.

It will be noted that all these parts are duplicated for the other drive wheel, the whole arrangement being symmetrical and the two universal joints 60 terminating at the differential 62, which drives them, and which itself is connected to the propeller shaft 63, driven by the motor in the customary way.

The operation of this form of the invention is substantially the same as that disclosed in diagrammatic Figs. 1 and 2. The wheels 51 may move vertically either in unison or independently, and in so doing they will stress the rubber sleeves 21 when they move together, while independent vertical motions of the said wheels will stress the rubber sleeve 33 to an extent corresponding to their difference.

In spite of such joint or independent motion of the wheels, the differential 62 will continue to deliver power to them, because of the universal joints 58 and 60 and the extension joints 59, and 61 which have been provided. In this form of the invention, the engine or motor of the vehicle may be located in the customary position, near the front thereof.

Referring now to Fig. 6, a modified form is disclosed wherein the motor 64 is located adjacent to the rear end of the vehicle. In this case it may drive the differential crown gear 65 through the cooperating pinion 66, carried on a shaft 67, driven from the motor shaft 68 through the bevel pinions 69 and 70. This results in a very compact structure wherein the differential housing 71 may be integral with the motor itself, as shown. The shafts 72 which extend from the opposite sides of the differential housing (only one being shown) will be connected to the universal joints such as 60 of Fig. 3, the remaining structure being substantially the same as that illustrated in Figs. 3, 4 and 5.

The operation of this form is substantially identical with that of the preceding form, the only difference being that the differential is driven from the short shaft 67 instead of through a long propeller shaft 63, as in the more conventional form wherein the engine is located at the front of the vehicle.

It will be seen that in all the forms disclosed the wheels are suspended by rubber springs so as to have independent vertical motion as well as joint vertical motion.

While the invention has been described herein by reference to several specific embodiments thereof, it should be understood clearly that these are given merely as illustrations and not as limitations of the scope thereof.

The scope of the invention therefore is defined solely in the following claims.

What I claim is:

1. A resilient wheel suspension for vehicles comprising a pair of substantially coaxial shafts rotatably supported in a chassis or vehicle body, means connecting said shafts to one another, comprising a torsion element of resilient non-metallic material having two facings secured respectively to two opposite surfaces thereof, means securing the shafts to the respective facings, said resilient non-metallic material being supported by said shaft so that it can substantially freely rotate relatively to said chassis or vehicle body together with said shafts if the latter move in unison relative to the chassis or vehicle body whereas relative rotation of said shafts about their common axis will stress the said element in torsional shear, and an additional torsionally-resilient member of non-metallic material such as rubber between each shaft and said chassis or body, said last-named member being adapted for resiliently supporting said chassis or body on the road wheels.

2. A resilient wheel suspension for vehicles, comprising a pair of substantially coaxial shafts rotatably supported in a chassis or vehicle body, means connecting said shafts to one another, comprising a rubber element having two metal plates vulcanized respectively to two opposite faces thereof, means securing the shafts to the respective metal plates, whereby relative rotation of said shafts about their common axis will stress the said rubber element in torsional shear, and an additional torsionally-resilient member of non-metallic material such as rubber between each shaft and said chassis or body, said last-named member being adapted for resiliently supporting said chassis or body on the road wheels.

3. A resilient wheel suspension for vehicles, comprising a pair of substantially coaxial shafts, rotatably supported in a chassis or body of the vehicle, means connecting said shafts to one another and comprising a sleeve of resilient non-metallic material having metal facings secured respectively to two opposite surfaces thereof, means securing the shafts to the respective facings whereby relative rotation of said shafts about their common axis will stress the said sleeve in torsional shear, and an additional torsionally-resilient support between each shaft and the chassis or body, each such support including a sleeve made of resilient non-metallic material such as rubber, said sleeve having one surface adhesively attached to the respective shaft and the other surface to an adjacent part of the chassis or body.

4. A resilient wheel suspension for vehicles, comprising a pair of substantially coaxial shafts, rotatably supported in a chassis or body of the vehicle, means connecting said shafts to one another, comprising a tubular rubber element having two metal tubes vulcanized respectively to the inner and outer cylindrical surfaces thereof, the outer metal tube having a longitudinal slit therein, means securing the shafts to the respective metal tubes, and comprising a key engaged in said slit, whereby relative rotation of said shafts about their common axis will stress the said rubber element in torsional shear, and an additional torsionally-resilient support between each shaft and said chassis or body.

5. In a spring suspension for supporting resiliently and rotatably around an axis two members with respect to one another, a first sleeve of resilient non-metallic material such as rubber, said sleeve having its inner surface rigidly connected to the one of said two members, a second sleeve of substantially rigid material such as metal being adhesively connected to the outer surface of said first sleeve, said second sleeve being provided with at least one longitudinal slot, the other of said two members being provided with means overlying said second sleeve and entering into said slot.

6. In a spring suspension for supporting resiliently and rotatably around an axis two members with respect to one another, a first sleeve of resilient non-metallic material such as rubber, said sleeve having its inner surface rigidly connected to the one of said two members, a second sleeve of substantially rigid material such as metal being adhesively connected to the outer surface of said first sleeve, said second sleeve being provided with at least one longitudinal slot, the other of said two members being provided with means for removably connecting said second sleeve to said other member; said means comprising two substantially half-cylindrical shells adapted to fit over said sleeve and to be clamped thereon, and a flat member interposed and held between said two half-shells and entering into said slot of said second sleeve.

7. In a spring suspension for supporting resiliently and rotatably around an axis two members with respect to one another, a first sleeve of resilient non-metallic material such as rubber, said sleeve having its outer surface rigidly connected to the one of said two members, a second sleeve of substantially rigid material such as metal being adhesively connected to the inner surface of said first sleeve, two shaft members each being provided with a radial disc at one end, said discs being rigidly connected to said second sleeve in the interior thereof and in axially spaced relation from each other, the shafts extending from said sleeves in opposite directions and forming with said sleeve in effect one rigid composite shaft structure.

JOSEPH LEDWINKA.

DISCLAIMER 2,286,609.—*Joseph Ledwinka*, Philadelphia, Pa. WHEEL SUSPENSION FOR VEHICLES.
   Patent dated June 16, 1942. Disclaimer filed February 13, 1943, by the assignee, *Edward G. Budd Manufacturing Company*.
Hereby enters this disclaimer to claim 2 of said patent.
   [*Official Gazette March 16, 1943.*]